(No Model.)
E. DAVIS.
COMBINED INKSTAND SUPPORT AND PEN RACK.
No. 486,279. Patented Nov. 15, 1892.
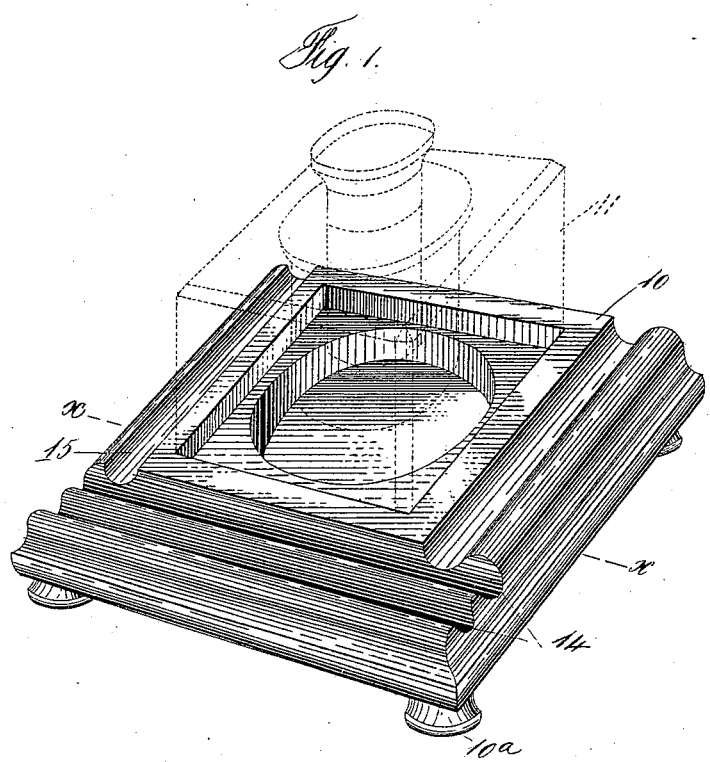
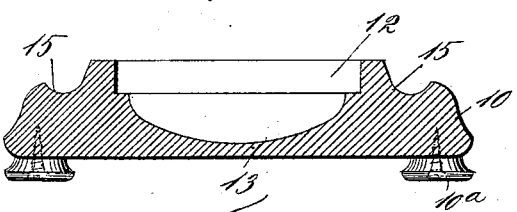
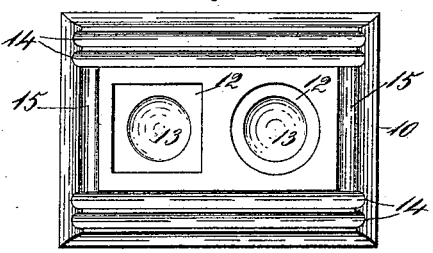
WITNESSES:
John Buckler,
P. J. Griffith
Emry Davis,
INVENTOR

UNITED STATES PATENT OFFICE.

EMRY DAVIS, OF NEW YORK, N. Y.

COMBINED INKSTAND-SUPPORT AND PEN-RACK.

SPECIFICATION forming part of Letters Patent No. 486,279, dated November 15, 1892.

Application filed May 4, 1892. Serial No. 431,831. (No model.)

*To all whom it may concern:*

Be it known that I, EMRY DAVIS, a citizen of the United States, and a resident of the city of New York, county and State of New York, have invented a new and useful Improvement in a Combined Inkstand-Support and Pen-Rack, of which the following is a specification.

My invention relates to penmen's utensils; and its object is to provide a device combining a rack for penholders and pencils, an inkstand-support, and a receptacle for pens, pins, seals, paper-fasteners, and various other articles necessary for penmen's use, the latter receptacle being entirely concealed when the inkstand is in place, but readily accessible at any time, the device as a whole being compact and adding ornament to the desk or table upon which it is located.

The accompanying drawings, forming a part hereof, illustrate my invention, similar reference-numerals designating like parts in all the views.

Figure 1 is a perspective view of the device adapted for use on a single desk, showing in dotted lines an inkstand in place thereon. Fig. 2 is a sectional front elevation of the same on the line $x\,x$ in Fig. 1, the inkstand being removed; and Fig. 3 is a plan view of the device as adapted for use upon a double desk.

The body 10 of the device, which is supported upon suitable legs $10^a$, may be of any desired dimensions, according as it is to support one or more inkstands, and the marginal edges of said body may be formed as shown in the drawings or given any other preferred ornamentation. In the body 10 is formed a recess or recesses 12, adapted to receive snugly, yet removably, an inkstand or inkstands 11, the contour of said recess conforming to the shape of the body of the inkstand, which may be either square, as shown in the drawings, or of other preferred shape. In the base of the recess 12 is formed a chamber 13, of less diameter than the recess 12, and which may be circular, as shown, or may follow the lines of the recess. The chamber, being adapted to receive pens, pins, seals, paper-fasteners, &c., is, however, preferably of circular form, and may have a flat bottom, but, as shown, has a concaved or rounded bottom, as the articles last named may be more readily removed when needed. Such grooves, however, are of the usual character and no claim is laid to them.

Parallel with the sides of the body on its upper face and outside the recess 12 are formed one or more grooves 14 and 15, the two sets of grooves being at right angles to each other and being adapted to receive penholders, pencils, erasers, &c.

In use the chamber 13 is supplied with pens, pins, seals, paper-fasteners, &c., and the filled inkstand fitted to place in the recess 12, completely closing the chamber and concealing it and its contents and preventing the access of dust thereto, and whenever necessary the contents of said chamber may be reached by simply removing the inkstand, the latter being then again replaced.

It will be seen that the device affords a stable support for the inkstand, and the contents of the interior chamber being concealed from view the unsightly appearance of scattered pins, pens, &c., so often noticeable about penmen's tables and desks is avoided. Further, by the provision of the separate sets of grooves in the upper face of the body of the support and rack the penholders and pencils can be kept separate, so that soiling of the latter by the former may be avoided.

Having thus described my invention, I claim as new and desire to secure by Letters Patent—

1. A combined pen and pencil rack and inkstand-support consisting of a body or base having one or more recesses in its upper face and a chamber in the base of said recesses, substantially as shown and described.

2. A combined pen and pencil rack and inkstand-support consisting of a base or body having one or more recesses in its upper face and a chamber in the base of said recesses and of less diameter than the recesses, substantially as shown.

3. A combined pen and pencil rack and inkstand-support consisting of a body or base having one or more rectangular recesses therein in its upper face and a circular chamber in the base of said recesses of less diameter than the recesses, substantially as shown and described.

In testimony that I claim the foregoing as my invention I have signed my name, in presence of two witnesses, this 25th day of April, 1892.

EMRY DAVIS.

Witnesses:
ADOLPH COHEN,
MATILDA M. BERRY.